Sept. 30, 1952 K. HRČEK 2,611,969
ELECTROMAGNETIC CLAMPING AND DIVISION APPARATUS
Filed Aug. 6, 1947 2 SHEETS—SHEET 1
FIG. 1.
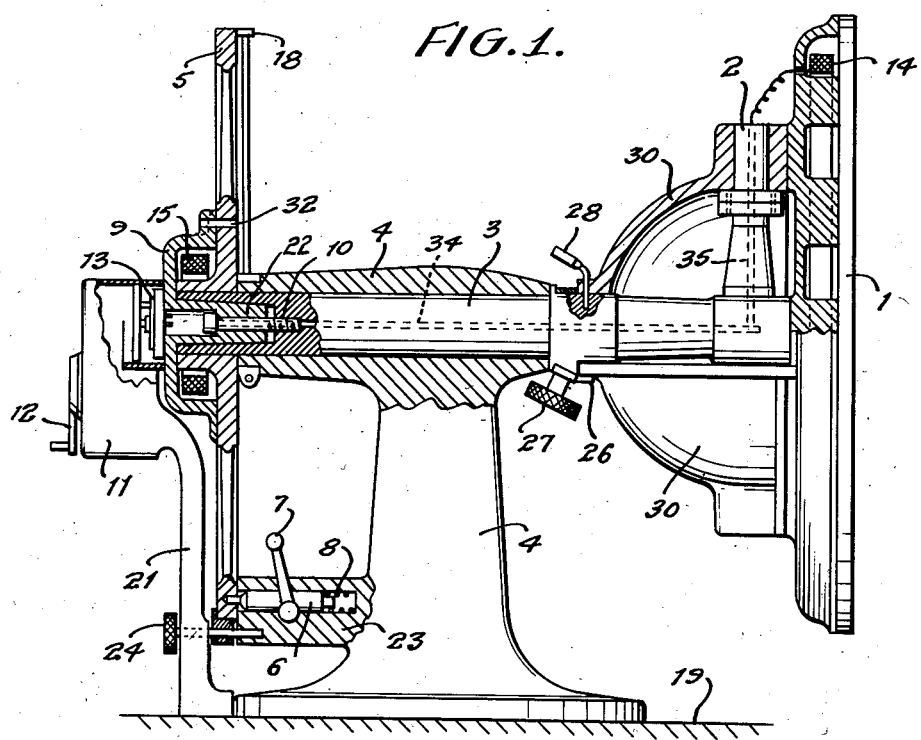
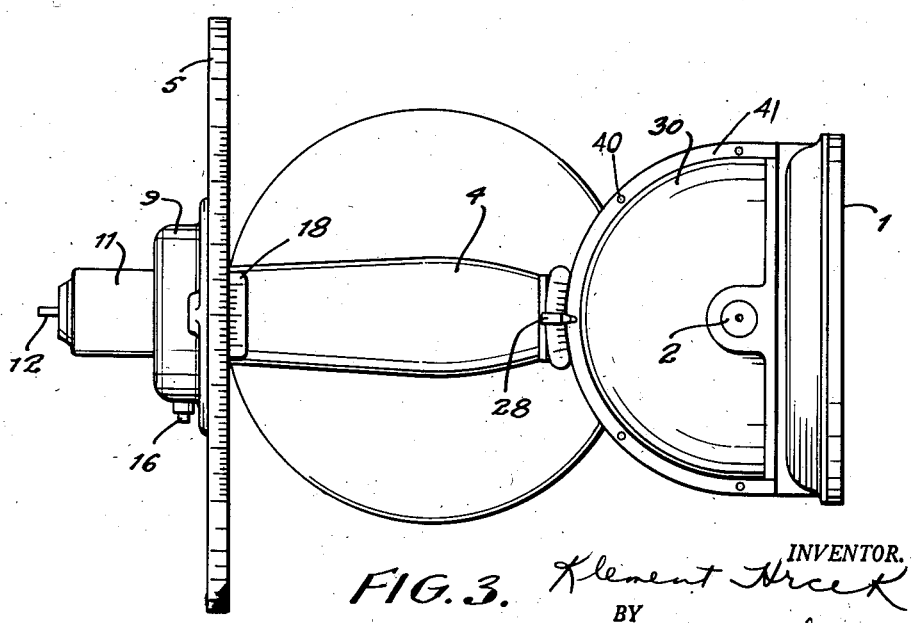
FIG. 3.
INVENTOR.
Klement Hrček
BY INVENTOR.
Klement Hrcek
BY
Michael Stern Patented Sept. 30, 1952

2,611,969

UNITED STATES PATENT OFFICE 2,611,969

ELECTROMAGNETIC CLAMPING AND DIVISION APPARATUS

Klement Hrček, Brunn, Kralovo Pole, Czechoslovakia

Application August 6, 1947, Serial No. 766,799
In Germany October 4, 1943

Section 1, Public Law 690, August 8, 1946
Patent expires October 4, 1963

5 Claims. (Cl. 33—174)

The present invention relates to an electromagnetic clamping and lay-out apparatus for marking and checking of objects on machine-drawing boards wherein an electromagnetic clutch is switched in between the magnetic clamping plate and the freely turnable dividing wheel.

In the known apparatus of this type, the dividing wheel is connected to the shaft of the electromagnet allowing adjustment of the object in the most convenient tracing position which not only entails a centering of the object in respect of the turning axis of the electromagnetic plate, but also an adjustment of the main axis of the object parallel to the tracing plate, in order to render possible the turning and tracing of the object with the use of the openings of the wheel at 90°, 180° etc. such as is most frequently the case in tracing operations. The object, adhering by the action of the magnet to the turnable magnet plate of the apparatus is centered by blows with a wooden hammer, but the centering of the object and simultaneous setting of its main axis in a position parallel to the tracing plate is an extremely tiresome operation, as any displacement of the object results in a deviation from its centering position and vice versa.

A further drawback of the known constructions of such apparatus consists in the uneven wear of the adjusting openings of the dividing wheel. The openings at 0, 90, 180, 270° whereby the electromagnetic clamping plate is set into the horizontal and vertical positions frequently occurring in tracing, are worn much more rapidly than the openings at 15, 30, 45, 60° etc. which are not so often used. The rapid wear of the above said four openings deteriorates however the entire apparatus.

The dividing wheel of the apparatus according to the invention is turnable, forms the free element of the electromagnetic clutch and may be fixedly connected to the electromagnetic holding plate by switching on the electric current and released therefrom by switching the current off. Such arrangement facilitates the tracing operation and prevents the irregular wear of the dividing openings, thus maintaining the precision of the apparatus within the limits of the permissible tolerance for a much longer period.

Figure 2:
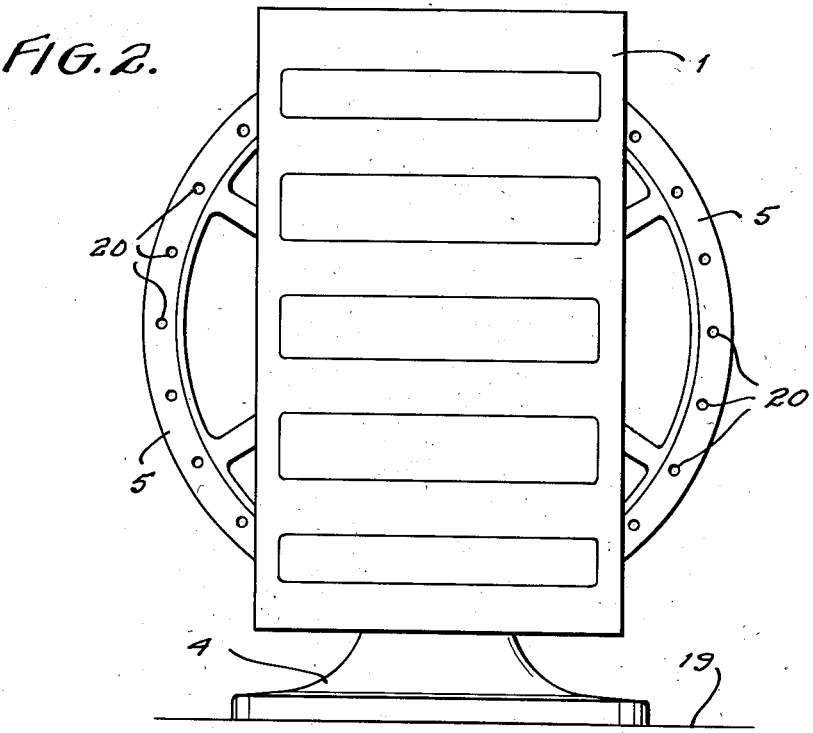
Figure 5:
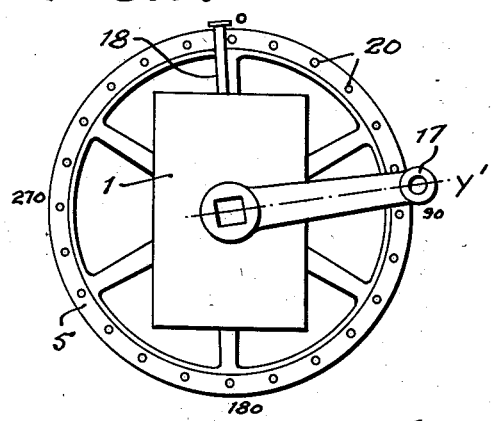
Figure 6:
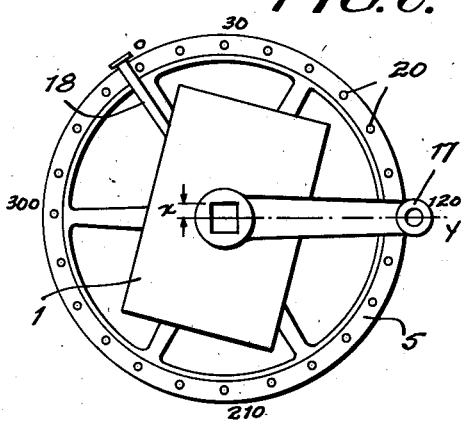
Figure 4:
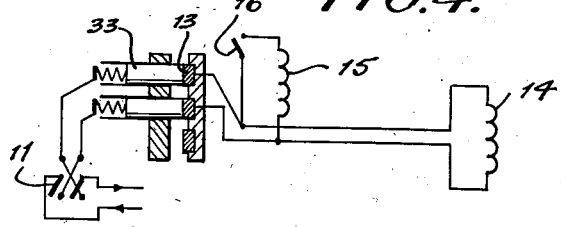

Fig. 1 shows a longitudinal cross-section of the apparatus, Fig. 2 is a view of the holding plate, Fig. 3 is a plan view, in Fig. 4 is a diagram of the electric circuit and Figs. 5, 6 show the operation of the apparatus.

The electromagnetic holding plate 1 is pivotal on the transverse pivot 2 of the main shaft 3 pivoted in the upright 4 screwed onto the drawing plate. At the end of the shaft 3 the dividing wheel 5 is mounted by a ferromagnetic portion thereof in a turnable manner, said wheel being divided on its circumference in 360 degrees and provided laterally of the rim with 24 openings wherein the setting peg 6 guided in the upright 4 is engaged, said peg being capable of being engaged or disengaged by means of a crank 7 and spring 8 within the openings of the wheel. Into the shaft 3 is inserted the cone of the electromagnetic coupling clutch 9 and tightened by a hollow screw 10.

The electric outfit of the new apparatus consists of a magnetic coil 14 for exciting the electromagnetic clamping plate 1 and of the coil 15 in the electromagnetic coupling 9. Direct current is being fed through the hollow holder 21, which in its top part is widened to box shape to the built-in change-over switch 11 of controller type, whereby electric current is switched on or off or over to the magnetic coils 14, 15. When the crank 12 of the switch is in its horizontal right-hand or left-hand position, the current is switched on, while in its upwards or downwards vertical position the current is switched off.

From the switch 11 the electric current is led over brushes 33 (Fig. 4) to the collector rings 13 fixed to the hub of the coupling 9 wherefrom the electric conductors are led through a drilled screw 10 and opening 34 in the main shaft 3 and through the opening 35 in the transverse pinion 2 to the magnetic coil 14 provided in the clamping plate and back to switch 11. The electromagnetic coil 15 in the coupling 9 is connected to the main current circuit in parallel over a single-pole switch 16 as shown diagrammatically in Figure 4.

Switch 11 is designed as a two-pole reverser switch whereby the current direction into the coil is inverted in order to change the polarity of the magnet.

By switching off the current and thereupon switching the same on for a while in inverted direction and again switching off, the remanent magnetism is eliminated from the electromagnet and the work clamped may then be easily removed from the clamping face. If the current is merely switched off without change of polarity, the remanent magnetism may even be so strong as to hamper the removal of a heavier piece.

In the embodiment shown in the drawings, the clamping plate 1 and thereby the object clamped thereon are demagnetized by turning the crank 12 of the change-over switch 11 from the horizontal position (switch on) by a ¾ turn to the left or to the right and stopping it in top or in bottom position (switched off). By such operation the current is first switched off, then for a while switched on again with inverted polarity changing the polarity of the magnet and again switched off. The iron work clamped on the magnet may then be easily taken off.

The magnetic coupling 9 is switched on and off as required through a single-pole switch 16, while the electromagnetic plate 1 is under current, i. e. the crank 12 is in the horizontal "switched on" position.

Hereafter will be explained by way of comparison the tracing operation according to the old method illustrated diagrammatically in Figure 5, and in the new apparatus provided with an electromagnetic coupling as illustrated diagrammatically in Figure 6.

In both cases the crank 17 on the machined hub of which a square aperture is to be marked symmetrically to the axis, is applied to the electromagnetic clamping plate 1 as centrally as possible whereupon the electric current is switched on by the switch 11, the crank 12 of which is brought into a horizontal position "switched on," thus clamping the crank 17 magnetically. The person making the tracing then turns the electromagnetic plate 1 with one hand, and with the other knocks the work 17 observing at the same time the deviations between the tracing needle of a marker (not shown) and the hub of the crank 17, or on an indicator (not shown) so as to center said hub accurately in like manner as a turner turns and knocks the work on the lathe to make the same turn concentrically with the axis of rotation.

After accurately centering the hub of the crank 17, the electromagnetic plate 1 is angularly displaced in such manner that the longitudinal axis y of the crank 17 is horizontal and thus parallel to the plane of the marking plate 1 shown in Figure 1. The accurate parallel relationship is measured by an indicator (not shown). Thereupon the measuring wheel 5 is turned so as to place the index stud 6 (Fig. 1) into one of the measuring apertures 20, e. g. into the aperture marking 210° as seen in Figure 6. Through the switch 16 the electric current is switched on to the coupling 9 which is thereby magnetized and attracts the measuring wheel 5 constituting the free element of the coupling thus connecting firmly the wheel 5 with the coupling 9, shaft 3, transverse pinion 2 and the electromagnetic plate 1 supported rotatably thereon, as shown in Figure 1. The conical element 22 of the magnetic coupling 9 mates with a corresponding cone provided in the shaft 3 and is tightened therein by the screw 10. The index 18 (Figs. 1, 6) is shifted so as to be opposite the aperture 20 corresponding to 0° (Fig. 6) on the circumferential scale of the wheel 5. The tracing needle of the parallel marker which is generally known and is not illustrated in the drawing, is then adjusted into the axis of rotation of the apparatus and the main axis y traced on the crank 17, (Fig. 6). Thereupon the tracing needle is raised or lowered by a distance $x$ above or below the axis y and the top or bottom side of the square is traced, the index stud 6 shifted to the right by a movement of the crank 7 (Fig. 1), the measuring wheel 5 (Fig. 6) turned to the left by about 90° and the index stud 6 released by turning the crank 7 to the left (Fig. 1), so as to come into engagement by the thrust of the spring 8 with the aperture 20 on 300°. Then the second side of the square is traced. The index stud 6 is shifted and the wheel 5 turned further to the left on the indicator 18 to 180°, the index 6 is engaged with the aperture 20 on 30° and the third side of the square is traced, then the index stud is again shifted and the wheel turned further to 270° whereupon the index stud 6 mates the aperture 20 on 120°, and the last side of the square is then traced. The indicator 18 serves for a speedy approximate adjustment of the required angles without reading the vernier, merely in accordance with the numerals engraved on the scale of the wheel 5, whereas the index stud 6 by its rounded end slides smoothly into the aperture 20 of the measuring wheel 5, thus exactly securing the position of said wheel.

In contradistinction thereto, if in the old apparatus shown diagrammatically in Figure 5, the clamping plate 1 is angularly displaced so that the axis $y'$ of the crank 17 disposed for tracing, is placed in parallel position with regard to the tracing plate 19, it is impossible during the tracing operation to utilize the advantages of a speedy and accurate direct division by means of the division apertures 20 and of the index stud 6, as the division apertures 20 will be beyond the index stud 6, the measuring wheel 5 being in this case firmly fixedly connected to the clamping plate 1 and being displaced therewith. From the diagram it may be clearly seen that the crank 17 is placed between two index apertures on 75° and 90° although being in a horizontal position. In order to enable the square to be traced on the crank 17 having been previously placed in a position parallel to the tracing plate, it will be necessary to displace the indicator 18 angularly against 0° on the scale of the wheel 5 tracing thereupon the first side of the square, whereupon the measuring wheel 5 is turned further on the scale and vernier to 90° tracing then the second side and so forth by means of the scale on the measuring wheel 5 and the indicator with vernier 18.

A comparison between the operational methods on the old fixture on the one hand and on the apparatus according to the present invention on the other hand, makes clear that the substantial time saving is large, achieved in the adjustment of the work in the position suitable for tracing and in the tracing operation proper, the operation being, moreover, accurate owing to the prevailing direct measuring by means of division apertures 20 and index stud 6. The accuracy of the apparatus is kept up longer within the limits of the requisite allowance as the apparatus according to the invention is not working prevailingly with index apertures 0°, 90°, 180°, 270° on the horizontal and vertical axis as is the case in the old apparatus with fixed wheel 5 having no electromagnetic coupling, said apertures being subjected to wear and tear by being frequently used.

In the apparatus according to the invention, it is possible to use any of the 24 index apertures of the measuring wheel as initial apertures so that the wear and tear is more evenly distributed, and smaller.

The electromagnetic clamping plate 1 may also be turned through an angle of 180° about the axis 2 which is perpendicular to axis 3. A flange 41 of the bearing covers 30 is provided with index apertures 40 (Fig. 3) displaced against one another by 45° so as to secure the plate 1 in a vertical plane which is parallel to the transverse pinion 2 in different positions corresponding to the apertures 40, respectively. The flange 41 of the cover 30 has a graduation up to 180° and the electromagnetic plate may be locked in any position up to the extent of 180° by the screw 27 and socket 26 after retracting the index stud 28. The electromagnetic clamping plate 1 may also be mechanically connected with the measuring wheel 5, by inserting the index stud manually into the aperture 32; the longitudinal edges of the clamping plate 1 are then exactly perpendicular to the plane of the marking plate 19.

I claim:

1. A lay-out fixture in which the objects are clamped electromagnetically to a clamping plate, comprising in combination, a shaft; an electro-magnetic clamping plate; means for connecting said clamping plate to one end of said shaft; a dividing wheel loosely mounted on the other end of said shaft and having a ferromagnetic portion adjacent to said shaft; electro-magnetic clutch means magnetizing said ferromagnetic portion so as to clamp said wheel to said shaft; and a body rigidly connected to said shaft and forming part of said clutch means, said portion cooperating with said body.

2. A lay-out fixture in which the objects are clamped electromagnetically to a clamping plate, comprising in combination, a shaft; an electro-magnetic clamping plate; means for connecting said clamping plate to one end of said shaft; a dividing wheel loosely mounted on the other end of said shaft and having a ferromagnetic portion adjacent to said shaft; electro-magnetic clutch means magnetizing said ferromagnetic portion so as to clamp said wheel to said shaft; a body rigidly connected to said shaft and forming part of said clutch means, said portion cooperating with said body; and a circumferential division on said wheel, said wheel having index apertures.

3. A lay-out fixture in which the objects are clamped electromagnetically to a clamping plate, comprising in combination, a shaft; an electro-magnetic clamping plate; means for connecting said clamping plate to one end of said shaft; a dividing wheel loosely mounted on the other end of said shaft and having a ferromagnetic portion adjacent to said shaft; electro-magnetic clutch means magnetizing said ferromagnetic portion so as to clamp said wheel to said shaft; and an electro-magnetic coil rigidly connected to said shaft and forming part of said clutch means.

4. A lay-out fixture in which the objects are clamped electromagnetically to a clamping plate, comprising in combination, a shaft; an electro-magnetic clamping plate; means for connecting said clamping plate to one end of said shaft; a dividing wheel loosely mounted on the other end of said shaft and having a ferromagnetic portion adjacent to said shaft; electro-magnetic clutch means magnetizing said ferromagnetic portion so as to clamp said wheel to said shaft; an electro-magnetic coil rigidly connected to said shaft and forming part of said clutch means; an electric circuit for exciting said electro-magnetic clamping plate; and means for supplying current to said coil, said supplying means and said coil being connected in parallel to said circuit.

5. A lay-out fixture in which the objects are clamped electromagnetically to a clamping plate, comprising in combination, a shaft; an electro-magnetic clamping plate; means for connecting said clamping plate to one end of said shaft; a dividing wheel loosely mounted on the other end of said shaft and having a ferromagnetic portion adjacent to said shaft; electro-magnetic clutch means magnetizing said ferromagnetic portion so as to clamp said wheel to said shaft; an electro-magnetic coil rigidly connected to said shaft and forming part of said clutch means; an electric circuit for exciting said electro-magnetic clamping plate; means for supplying current to said coil, said supplying means and said coil being connected in parallel to said circuit; and switching means for said electro-magnetic coil, said switching means being operative only after said electric circuit has been energized.

KLEMENT HRČEK.

REFERENCES CITED

The following references are of record in the file of this patent:

UNITED STATES PATENTS

| Number | Name | Date |
|---|---|---|
| 420,278 | Miller | Jan. 28, 1890 |
| 612,412 | Grohmann | Oct. 18, 1898 |
| 1,814,891 | Bing | July 14, 1931 |
| 2,101,671 | Cooper | Dec. 7, 1937 |
| 2,173,519 | Jones | Sept. 19, 1939 |
| 2,342,539 | Gorton | Feb. 22, 1944 |
| 2,345,312 | Sorensen | Mar. 28, 1944 |

FOREIGN PATENTS

| Number | Country | Date |
|---|---|---|
| 20,402 | Great Britain | 1913 |